(12) United States Patent
Salihu et al.

(10) Patent No.: US 11,961,105 B2
(45) Date of Patent: Apr. 16, 2024

(54) METHOD AND SYSTEM OF ACCRETIVE VALUE STORE LOYALTY CARD PROGRAM

(71) Applicant: GANART TECHNOLOGIES, INC., Carrollton, TX (US)

(72) Inventors: Mohamed Safir Salihu, Coppell, TX (US); Wayne Thomas McHugh, Little Elm, TX (US); Arthur Martin Holbrook, Flower Mound, TX (US); Purnendu Mishra, Frisco, TX (US); Lee Coleman, Sugarland, TX (US)

(73) Assignee: GANART TECHNOLOGIES, INC., Dallas, TX (US)

( * ) Notice: Subject to any disclaimer, the term of this patent is extended or adjusted under 35 U.S.C. 154(b) by 0 days.

(21) Appl. No.: 14/523,521

(22) Filed: Oct. 24, 2014

(65) Prior Publication Data

US 2016/0117714 A1  Apr. 28, 2016

(51) Int. Cl.
*G06Q 30/00* (2023.01)
*G06Q 30/0226* (2023.01)

(52) U.S. Cl.
CPC .............. *G06Q 30/0232* (2013.01)

(58) Field of Classification Search
CPC . G06Q 30/02; G06Q 30/0268; G06Q 30/0232
See application file for complete search history.

(56) References Cited

U.S. PATENT DOCUMENTS

| 5,253,167 A | 10/1993 | Yoshida et al. |
| 5,878,405 A | 3/1999 | Grant et al. |
| 6,519,571 B1 | 2/2003 | Guheen et al. |
| 6,775,729 B1 | 8/2004 | Matsuo et al. |

(Continued)

FOREIGN PATENT DOCUMENTS

| KR | 10-2005-0000772 A | 1/2005 |
| KR | 10-2010-0001836 A | 1/2010 |

OTHER PUBLICATIONS

Ozdenizci; A beneficial model to promote loyalty on smart cards of mobile devices; ISIK University; 6 pages; 2011.*

(Continued)

*Primary Examiner* — Radu Andrei

(57) ABSTRACT

A method of enabling an employee to utilize earned and unpaid earnings includes receiving, with a with a central office processor, a record of an employee's accrued and unpaid earnings for a predetermined time period and storing the record in a database. The method further includes receiving, with the central office processor, an electronic request from an employee to access the employee's record of accrued and unpaid earnings for the predetermined time period. Upon receipt of the request, the central office processor accesses the database including the record of the employee's accrued and unpaid earnings for the predetermined time period and determines an amount of the employee's accrued and unpaid earnings for the predetermined time period available to the employee and transmits the amount for display to the employee. The central office processor may also authenticate the employee's identity upon receiving the request to access the employee's accrued and unpaid earnings by comparing verification information transmitted from the user device to information in the employee record.

4 Claims, 12 Drawing Sheets

(56) References Cited

U.S. PATENT DOCUMENTS

| | | | |
|---|---|---|---|
| 6,850,996 B2 | 2/2005 | Wagner | |
| 6,970,846 B1 | 11/2005 | Drummond et al. | |
| 7,025,255 B1 | 4/2006 | Drummond et al. | |
| 7,051,096 B1 | 5/2006 | Krawiec et al. | |
| 7,062,464 B1 | 6/2006 | Drummond et al. | |
| 7,472,824 B2 | 1/2009 | Ramachandran | |
| 7,519,653 B1 | 4/2009 | Coutts et al. | |
| 7,543,020 B2 | 6/2009 | Walker et al. | |
| 7,606,401 B2 | 10/2009 | Hoffman et al. | |
| 7,716,096 B2 | 5/2010 | Drummond et al. | |
| 7,725,393 B2 * | 5/2010 | Drummond | G07F 19/211 235/379 |
| 7,747,527 B1 | 6/2010 | Korala | |
| 7,930,340 B2 | 4/2011 | Arunachalam | |
| 7,937,329 B1 * | 5/2011 | Cooperstone | G06Q 10/1057 705/322 |
| 8,033,375 B2 * | 10/2011 | Doran | G06Q 20/10 221/217 |
| 8,250,187 B2 | 8/2012 | Cacheria, III et al. | |
| 8,255,499 B2 | 8/2012 | Cacheria, III et al. | |
| 8,429,068 B1 | 4/2013 | Fasoli et al. | |
| 8,433,769 B2 | 4/2013 | Cacheria, III et al. | |
| 8,463,669 B2 | 6/2013 | Cacheria, III et al. | |
| 8,751,338 B2 | 6/2014 | Dombroski et al. | |
| 9,268,904 B1 * | 2/2016 | Harding | G06F 16/212 |
| 10,005,281 B2 | 6/2018 | Yoshida et al. | |
| 2002/0032655 A1 | 3/2002 | Antonin et al. | |
| 2002/0169790 A1 | 11/2002 | Lee | |
| 2002/0171678 A1 | 11/2002 | Bandhole et al. | |
| 2002/0194242 A1 * | 12/2002 | Chandrasekaran | G06F 9/466 709/201 |
| 2003/0055782 A1 | 3/2003 | Slater | |
| 2003/0065618 A1 | 4/2003 | VanDeBoe | |
| 2003/0163710 A1 * | 8/2003 | Ortiz | H04L 63/0861 713/186 |
| 2004/0088551 A1 | 5/2004 | Dor et al. | |
| 2004/0098740 A1 | 5/2004 | Maritzen et al. | |
| 2004/0133477 A1 | 7/2004 | Morris et al. | |
| 2004/0139018 A1 | 7/2004 | Anderson et al. | |
| 2004/0240711 A1 | 12/2004 | Hamza et al. | |
| 2004/0255168 A1 * | 12/2004 | Murashita | G06K 9/00885 726/5 |
| 2005/0066331 A1 | 3/2005 | Inoue et al. | |
| 2005/0262182 A1 | 11/2005 | Thole | |
| 2006/0050862 A1 | 3/2006 | Shen et al. | |
| 2007/0080209 A1 * | 4/2007 | Fujita | G06Q 20/357 235/380 |
| 2007/0098223 A1 * | 5/2007 | Kamata | G06V 40/67 382/115 |
| 2007/0130338 A1 | 6/2007 | Malik et al. | |
| 2007/0168290 A1 | 7/2007 | Robinson | |
| 2007/0180490 A1 | 8/2007 | Renzi et al. | |
| 2007/0198287 A1 | 8/2007 | Outwater | |
| 2007/0198432 A1 | 8/2007 | Pitroda et al. | |
| 2007/0198665 A1 | 8/2007 | De Matteis et al. | |
| 2007/0226785 A1 | 9/2007 | Chow et al. | |
| 2007/0234410 A1 | 10/2007 | Geller | |
| 2008/0010375 A1 | 1/2008 | Coleman et al. | |
| 2008/0021772 A1 * | 1/2008 | Aloni | G06Q 30/0226 705/14.27 |
| 2008/0041942 A1 | 2/2008 | Aissa | |
| 2008/0077462 A1 | 3/2008 | Patel et al. | |
| 2008/0103970 A1 | 5/2008 | Books et al. | |
| 2008/0120129 A1 * | 5/2008 | Seubert | G06Q 40/125 705/305 |
| 2008/0191008 A1 | 8/2008 | Manfredi et al. | |
| 2009/0100178 A1 | 4/2009 | Gonzales et al. | |
| 2009/0132819 A1 | 5/2009 | Lu et al. | |
| 2009/0150711 A1 | 6/2009 | Kami et al. | |
| 2009/0192926 A1 | 7/2009 | Tarpata | |
| 2009/0210240 A1 | 8/2009 | Benschop et al. | |
| 2010/0005461 A1 | 1/2010 | Shribman et al. | |
| 2010/0094699 A1 * | 4/2010 | Beal | G06Q 40/12 705/30 |
| 2010/0076790 A1 | 5/2010 | Benja-Athon | |
| 2010/0179887 A1 * | 7/2010 | Cacheria, III | G06Q 20/105 705/26.1 |
| 2010/0179894 A1 * | 7/2010 | Cacheria, III | G06Q 20/1085 705/41 |
| 2010/0223110 A1 * | 9/2010 | Slavin | G06Q 30/0229 709/217 |
| 2010/0257040 A1 * | 10/2010 | Hunt | G06Q 30/0215 705/14.23 |
| 2010/0312629 A1 * | 12/2010 | Wolf | G06Q 30/0226 705/14.27 |
| 2011/0102141 A1 * | 5/2011 | Wu | G06F 21/32 340/5.82 |
| 2011/0173301 A1 | 7/2011 | Huang et al. | |
| 2013/0339242 A1 | 12/2013 | McHugh et al. | |
| 2014/0006127 A1 * | 1/2014 | DeCook | G06Q 30/0208 705/14.17 |
| 2014/0229397 A1 * | 8/2014 | Fink | G06Q 30/0279 705/329 |
| 2014/0289033 A1 * | 9/2014 | Ortigoza | G06Q 50/01 705/14.29 |
| 2014/0358655 A1 * | 12/2014 | Wheeler | G06Q 30/0233 705/14.33 |
| 2015/0220923 A1 * | 8/2015 | Vasant Akole | G06Q 20/405 705/44 |
| 2015/0287018 A1 * | 10/2015 | Iqbal | G06Q 20/40145 705/44 |
| 2015/0287028 A1 * | 10/2015 | DeLuca | G06Q 20/382 705/44 |
| 2015/0306875 A1 | 10/2015 | Nishimura et al. | |
| 2015/0310419 A1 * | 10/2015 | Kadaster | G06Q 20/322 705/72 |

OTHER PUBLICATIONS

Blanco-Justicia; Privacy-preserving Loyalty Programs; University of Taragona; 16 pages; Dec. 1, 2014.*

JunWu; Developing Smart Card Application with PC_SC; ICICIS; pp. 286-289; 2011.*

* cited by examiner

300

| | |
|---|---|
| EMPLOYEE NAME | JOHN SMITH |
| BIRTHDAY | MM/DD/YYYY |
| PERSONAL IDENTIFICATION CODE | XXXXXX |
| SOCIAL SECURITY NUMBER | XXX-XX-XXXX |
| DRIVER'S LICENSE NUMBER | XXXXXXXX |
| ADDRESS | XXX XX |
| | X X X X |
| PREFERRED STORES | XYZ, PQD, XDD |
| ACCRUED AND UNPAID EARNINGS BALANCE | $$$.$$ |
| PAST TRANSACTIONS | -------- |
| FINANCIAL INSTITUTIONS | - - - - - - |

```
         MENU
  CHECK BALANCE    ☐
  TRANSFER FUNDS   ☐
  WITHDRAW FUNDS   ☐
```

```
      TRANSFER FROM:
  ACCRUED EARNINGS  ☐
  CASH              ☐
  CHECK             ☐
  DEBIT CARD        ☐
  GIFT CARD         ☐
  CREDIT CARD       ☐
  AMOUNT        $$.$$
```

| STORE | POINTS | TRANSFERRED CASH BALANCE | TOTAL POINTS INCLUDING ACCRETIVE/BONUS POINTS |
|---|---|---|---|
| STORE 1 | 1200 | $70 | 1400 |
| STORE 2 | 800 | $50 | 900 |
| STORE 3 | 0 | $0 | 0 |

FIG. 15

| STORE | POINTS | TRANSFERRED CASH BALANCE | TOTAL POINTS INCLUDING ACCRETIVE/BONUS POINTS |
|---|---|---|---|
| STORE 1 | 200 | $6 | 110 |
| STORE 2 | 0 | $0 | 0 |
| STORE 3 | 2100 | $114 | 2400 |

FIG. 16

METHOD AND SYSTEM OF ACCRETIVE VALUE STORE LOYALTY CARD PROGRAM

TECHNICAL FIELD

The following disclosure relates to a system and method of enabling an employee to utilize earned and unpaid earnings and a method and system for an accretive value store loyalty card program.

BACKGROUND

Employers typically pay employees accrued earnings on a fixed schedule, for example every two weeks. At the end of a pay period, employees are paid the earnings they have accrued during the pay period. During the pay period, before the designated payday, employees typically have no means or method of accessing or using the earnings that they have accrued during the pay period. Although payday loans may be available, typically such loans involve high interest rates and have no direct connection to the employee's accrued earnings. Thus, there exists a system and method for enabling employee to access and utilize accrued and unpaid earnings during the pay period in which the earnings have accrued.

SUMMARY

A system for providing access to system-subscribing employees of their accrued and unpaid earnings includes at least one employee access node (terminal) located in an employer facility. The employee access node may include physical resources such as one or more displays, touch screens, keyboards, biometric scanners, currency dispensers, printers and similar devices for interfacing with subscribing employees to transfer value on behalf thereof. The employee access node may also include a transaction processor for facilitating transfer of value on behalf of the subscribing employees.

In one embodiment, a method of enabling an employee to utilize earned and unpaid earnings includes receiving, with a central office processor, a record of an employee's accrued and unpaid earnings for a predetermined time period and storing the record in a database. The employee's accrued and unpaid earnings include earnings due the employee on a predetermined date prior to the end of a payroll period but before the earnings have been disbursed to the employee. The method further includes receiving, with the central office processor, an electronic request from an employee to access the employee's record of accrued and unpaid earnings for the predetermined time period. Upon receipt of the request, the central office processor accesses the database including the record of the employee's accrued and unpaid earnings for the predetermined time period and determines an amount of the employee's accrued and unpaid earnings for the predetermined time period available to the employee. The available accrued and unpaid earnings may be displayed to the employee. The central office processor may also authenticate the employee's identity upon receiving the request to access the employee's accrued and unpaid earnings by comparing verification information transmitted from the user device to information in the employee record.

In one aspect, the employ transmits verification information to the central office processor with the request for access to accrued and unpaid earnings. The verification information may include one or more of an employee identification number, account number, password or biometric parameter such as a palm vein scan, a fingerprint scan, a retinal scan or similar parameter. The central office processor compares the transmitted verification information with information stored in the employee's record to verify the employee's identity before proceeding with the transaction.

The central office processor transmits employee's available accrued and unpaid earnings for display to the employee and receives an electronic request from the employee to transfer value, e.g., at least a portion of the employee's available accrued and unpaid earnings to an employee selected third party service provider such as a store or similar retail establishment. The requested amount is conveyed to the selected third party service provider or to a sponsoring bank that services the service provider and where the service provider maintains an account for holding such conveyed funds. The employee's record of accrued and unpaid earnings for the predetermined time period is then updated in the database to reflect the conveyed value of the employee's accrued and unpaid earnings.

In one aspect, the method further comprises the step of transmitting a request for a record of an employee's accrued and unpaid earnings for the predetermined time period from an employer payroll system. In another variation, the electronically transmitted record of an employee's accrued and unpaid earnings for a predetermined time period is transmitted to the central office processor at predetermined time intervals.

In another aspect the third party service provider may be a retail establishment that offers the employee an incentive to conduct a transaction using at least a portion of the conveyed amount of the employee's accrued and unpaid earnings. In this regard, the incentive may be transmitted to the employee for display on a user device. In another variation, a list of third party service providers and incentives offered by the third party service providers may be transmitted for display on a user device and the employee prompted to select from the displayed.

In one variation, a method of enabling an employee to utilize earned and unpaid earnings includes the step of receiving, with the central office processor, an electronic request from the employee to convey at least a portion of the employee's available accrued and unpaid earnings to a participating store, the participating store providing the employee with an incentive such as accretive value, to conduct a transaction with the participating store with at least a portion of the employee's accrued and unpaid earnings. The employee's record is verified and the balance checked to ensure that the available accrued and unpaid earnings balance is at least as much as the requested amount. The requested amount of accrued and unpaid earnings is then conveyed to a sponsoring bank where the participating store maintains an account wherein the conveyed accrued and unpaid earnings are deposited. The employee's record of accrued and unpaid earnings for the predetermined time period is updated in the database to reflect the conveyed amount of the employee's accrued and unpaid earnings.

In one aspect, the participating store offers an incentive to the employee to conduct a transaction with the participating store. The incentive provided by the participating store may be accretive value equal to a percentage of the transaction amount. In one variation, the employee may choose from multiple participating stores, each offering differing accretive values and/or incentives to take advantage of offers presented by the participating stores that the employee may patronize. The accretive value may be in addition to other bonuses or incentives offered by the participating store. The accretive value may be transmitted, by the central office to the employee requesting access to his or her unpaid earnings, for display to the user on a user device, before the employee purchases goods or services from the participating store to advise the employee of his or her purchasing power with the addition of the accretive value.

In another embodiment, a method of facilitating a transfer of value on behalf of a user for use at a selected store includes creating and maintaining a user record with a central office processor, the record including user profile and a record of funds conveyed and received on behalf of the user. The user is provided with means to electronically access the central office processor to convey funds on behalf of the user. The means for accessing the central office processor may include one or more of a system debit card, a personal identification code, a user password and a biometric parameter maintained in the user record whereby the user may access the processor by inputting the biometric parameter. The method includes receiving, with the central office processor, an electronic request from the user to convey funds on behalf of the user to a selected participating store, the selected participating store providing the user with an incentive to conduct a transaction with the participating store with the conveyed funds. The source of the funds is verified and the funds conveyed on behalf of the user to a sponsoring bank where the participating store maintains an account wherein the conveyed funds are retained on behalf of the user.

BRIEF DESCRIPTION OF THE DRAWINGS

For a more complete understanding, reference is now made to the following description taken in conjunction with the accompanying Drawings in which:

FIG. 15 is an exemplary display of user balances at different stores;

FIG. 16 is an exemplary display of the user balances of FIG. 15 after a store-to-store transfer.

DETAILED DESCRIPTION

Figure 1:
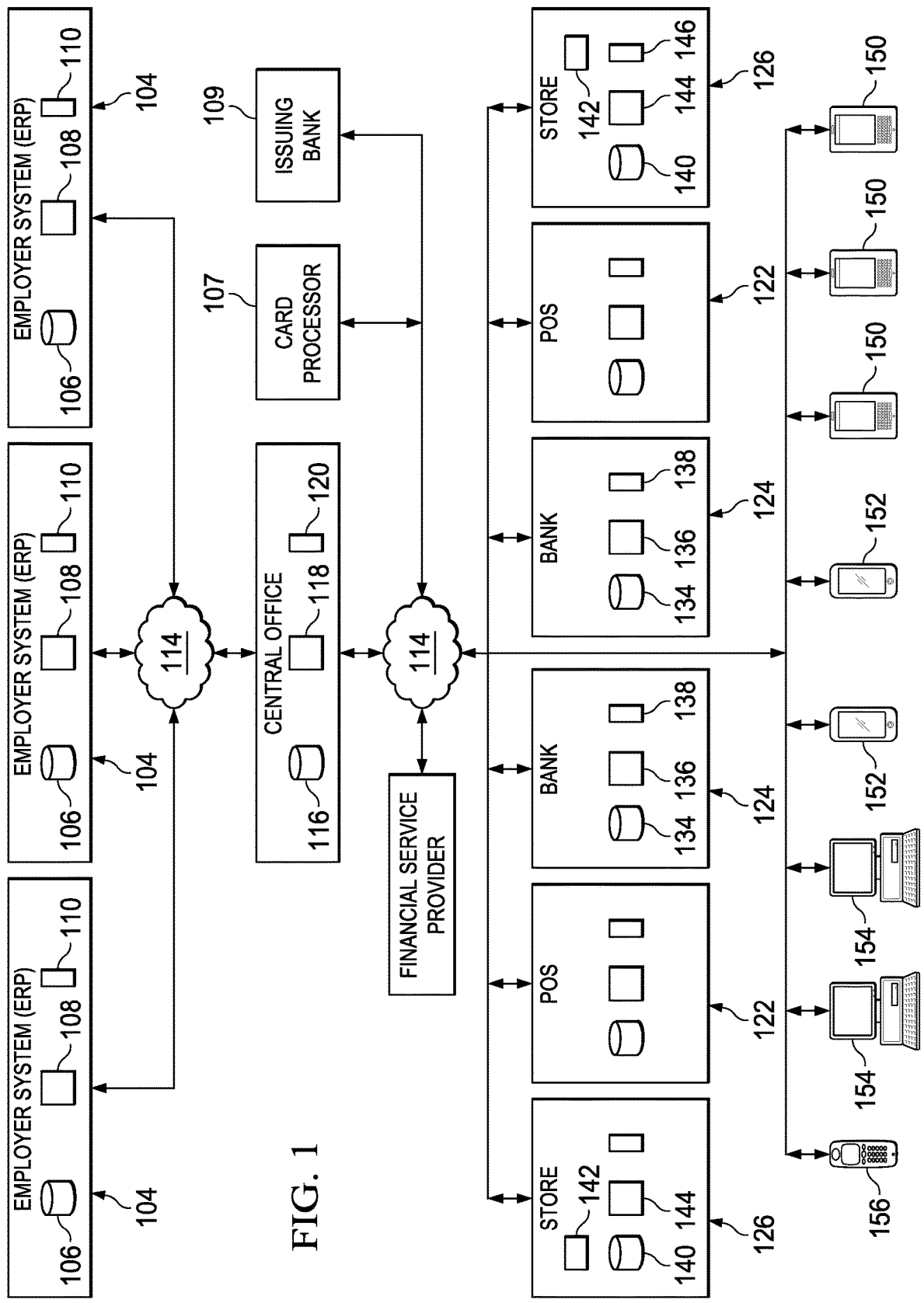
FIG. 1 is a diagrammatic block diagram illustrating the configuration of system for enabling employee utilization of accrued and unpaid earnings according to the disclosure.

Referring now to the drawings, wherein like reference numbers are used herein to designate like elements throughout, the various views and embodiments of a system and method of enabling an employee to utilize earned and unpaid earnings are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 is a diagrammatic block diagram illustrating the configuration of system 100 for enabling employee utilization of accrued and unpaid earnings. The system illustrated in FIG. 1 is designed to enable employees subscribing to the accrued and unpaid earnings service to access and utilize accrued but unpaid wages and earnings, typically accrued after the beginning of a pay period but before the next payday. System 100 includes a central office 102 that interfaces with service providers such as banks 124, stores 126, and point of sale operators 122. Central office 102 also interfaces with the employer systems 104 that may each include an Enterprise Resource Planning Module (ERP) module or similar computerized payroll record maintained by the employers. In one embodiment, central office 102 is maintained and operated by a third party (system operator) that maintains central office 102 to provide employees with access to accrued but unpaid earnings. Employees participating in the accrued but unpaid earnings service (subscribing employees) register with the system operator, directly or through their employer, and provide sufficient information to the system operator to enable the system operator to create and maintain records for the subscribing employees.

Each employer system 104 includes a data storage device and database 106 including employee payroll records, one or more processors 108 and a communication interface 110. Communications interface 110 enables data transmission and similar communications between the employer system 104 and central office 102 via a hardwired connection, a public or private network 114, a GSM connection or by means of the public telephone system (POTS).

Central office 100 includes one or more data storage device 116 that include a records database including employee information such as accrued and unpaid earnings and employee verification information, one or more central office processors 118 and a communications interface 120. Communication interface 120 enables central office 100 to interface with and communicate with service providers such as Point of Sale operators (POS) 122, banks 124 and stores or similar establishments 126. Each POS 122 includes one or more databases 128, processors 130 and communications interfaces 132 that enable communications via a hardwired connection, a cellular connection, a public or private network 114, a GSM connection or by means of the public telephone system (POTS). Stores 126 are typically a retail establishments such as a grocery store, restaurant, department store or similar providers of goods and services and may be provided with a data storage device 140, one or more data processors 144, one or more point of sale devices 142 and a communications interface 146 enabling the stores to communicate with point of sale operators POS 122, one or more banks or financial institutions 124 and/or central office 102 via network 114. Central Office 102 may also interface with a card issuing bank 109 to provide debit cards for subscribing employees that may be used as hereinafter described. Issuing bank 109 may communicate with card processor 107 sponsoring banks 124, participating stores 126, non-participating stores and other financial service providers 109 to facilitate the transfer of value on behalf of subscribing employees.

Central office 102 is configured to communicate with remote network access devices such as kiosks or terminals 150, a personal communications device 152 such as a smart phone, table or PDA, a personal computer 154, or similar device 156 that includes a communications interface, a user interface, processor and display. Central office 102 interfaces with remote network access devices 150-156 to enable employees to communicate with central office 102 and conduct transactions using the accrued and unpaid earnings system 100.

Figure 2:
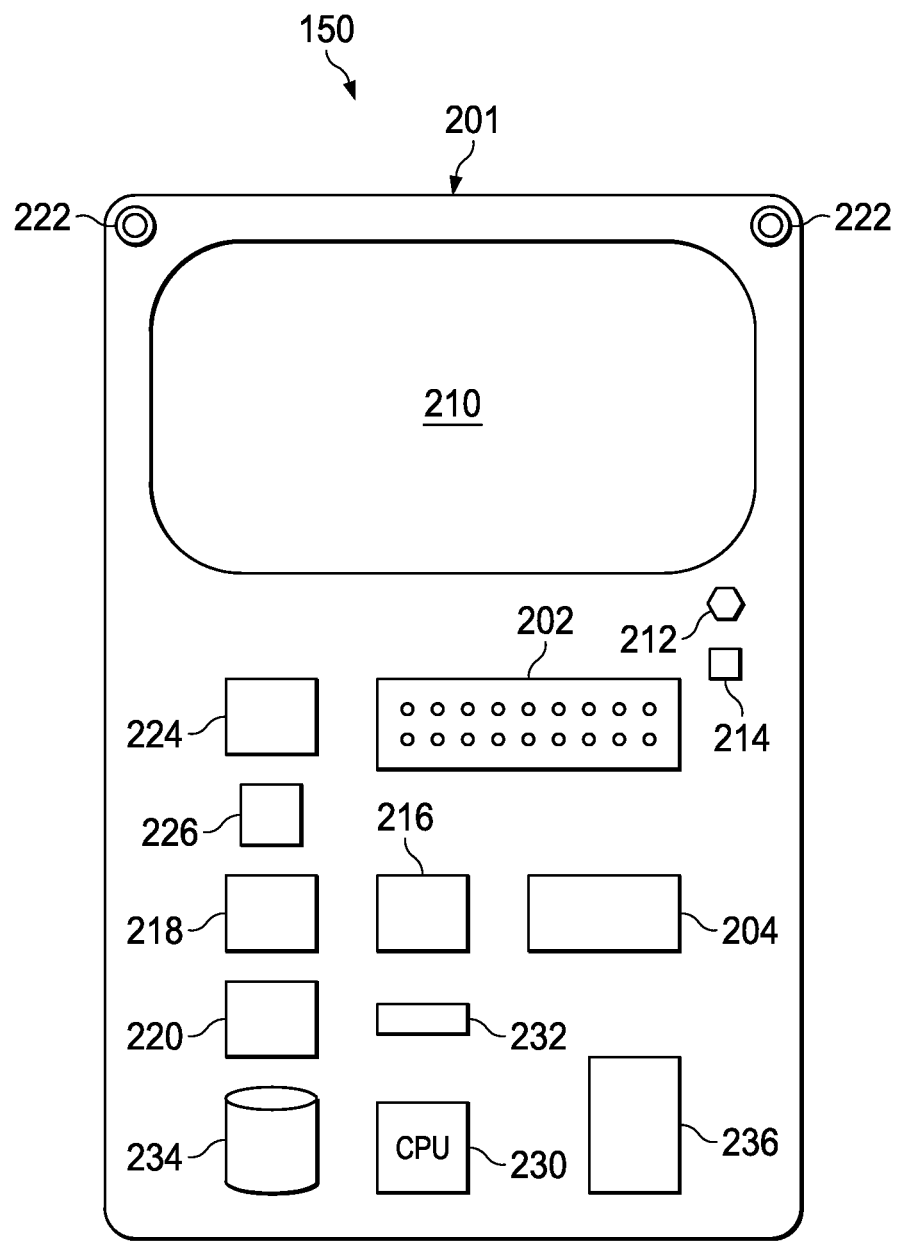
FIG. 2 is a schematic representation of a user terminal for use in the system of FIG. 1.

FIG. 2 is diagrammatic illustration of a terminal 150 for use in the system of FIG. 1. Each of terminals 150 is provided with a number of user interface devices (physical system or external resources) mounted in a housing 201 to allow a user to interface with the terminal 150. In one variation, the devices include a keyboard or keypad 202, a card scanner 204 for scanning cards such as debit and credit cards, gift cards and similar magnetically encoded or embedded chip cards and a touch screen 210. Other user interface devices may include a proximity sensor 212, a motion detector 214, a check scanner 216, a currency reader 218, a currency dispenser 220 and one or more still or video cameras 222. Terminal 110 may also include one or more biometric parameter interface devices such as a palm vein scanner 224 or a fingerprint or retinal scanner 226 for authentication purposes. Each of the user interface devices may be connected to a processor 230 via a physical system resource interfaces 232 including hardware and software enabling the physical system resources to communicate with processor.

Terminals 150 may also include a variety of output interface devices (not shown) that enable the terminal to provide services to users. Such output devices may include a magnetic card dispenser, a ticket printer and a receipt printer. In different embodiments, terminal 150 may also include a document printer, one or more media display devices, a money order dispenser and an audio output device such as a speaker. As illustrated, each of terminals 150 also includes a data storage device 234 associated with processor 230 and one or more communications interface devices 236. In one embodiment, processor 230 interfaces with central office 102 via public or private network 114 (FIG. 1). Application software for enabling employees to access accrued and unpaid earnings may be stored on data storage device 232 along with an operating system and other software enabling the terminal to function in different modes such as an ATM. Terminals 150 may be the same as, or similar to, and function similar to terminals 110 and/or 1810 described in U.S. Pat. No. 8,463,669 for a System for Providing Goods and Services Based on Accrued But Unpaid Earnings, (U.S. patent application Ser. No. 12/648, 931, filed Jan. 9, 2010), the specification of which is incorporated by reference herein in its entirety.

Figure 3:
FIG. 3 is a representation of an employee record maintained in the system of claim 1.
Figure 3:
Figure 3:
Figure 3:

FIG. 3 is a representation of a subscribing employee record 300 maintained in an employee database on data storage 116 of central office 102. The employee record may include fields for information such as an employee's name, employee identification code (EIC) and/or password, a social security number (SSN), a driver's license number, the employee's address, participating stores (as hereinafter described) patronized by the employee and/or stores where the employee is a subscriber to a loyalty program, the employee's available accrued but unpaid earnings, past transactions, financial institutions and services used by the employee with the corresponding account numbers and codes along with other pertinent information. The employee record may also include a photograph of the employee and a biometric parameter such as a palm vein scan, a fingerprint, a retinal scan or a voice print to aid in identifying and authenticating the employee in connection with a transaction.

For employee records that are updated on a daily basis, for example for employees that "clock" in or out according to their work schedule, an employee's pay records maintained in database 116 may be updated at predetermined intervals, for example, on a daily basis with a transmission from employer processor 108 to central office 102. In other embodiments, an employee's payroll record in database 116 may be updated at different predetermined time intervals. The employee payroll records for subscribing employees may be automatically transmitted to central office 102 from the employer's ERP by employer processor 108 as a push or pull operation with respect to the employer system. In yet another embodiment, central office processor 118 may transmit a request to employer processor 108 for a subscribing employee's payroll record 104 automatically upon receiving a request from a subscribing employee for access to the employee's accrued and unpaid earnings. Upon receipt of the employee payroll records for subscribing employees for the predetermined time period, central office processor 118 updates and stores the employee accrued and unpaid earnings record in database 116.

An employee's ability to access accrued and unpaid earnings or a given pay period or other predetermined time may suspended on a predetermined date and/or at a predetermined time prior to the employer's regularly scheduled disbursement of earnings. For example, if the employer normally disburses pay checks or makes direct deposits of employee earnings for a given pay period on a Friday, the employee's ability to access received and unpaid earnings for the pay period may be suspended, for example, at 5:00 pm on the Wednesday preceding the Friday when the employer makes normally scheduled disbursements. This allows time for the employer's pay records to be updated (debited) in the employer's ERP system to account for accrued but unpaid earnings used by an employee and enable the employer to disburse funds to the system operator account for transactions made by an employee using system 100 before the employer disburses earnings to subscribing employees for the pay period. Additionally, a limit may be placed on amount of funds that a subscribing employee may access. For example the subscribing employee may be limited to a percent, for example 50% of the employee's accrued and unpaid earnings or a fixed dollar amount, for example $500.00 of the subscribing employee's accrued and unpaid earnings that the subscribing employee may access.

Figure 4:
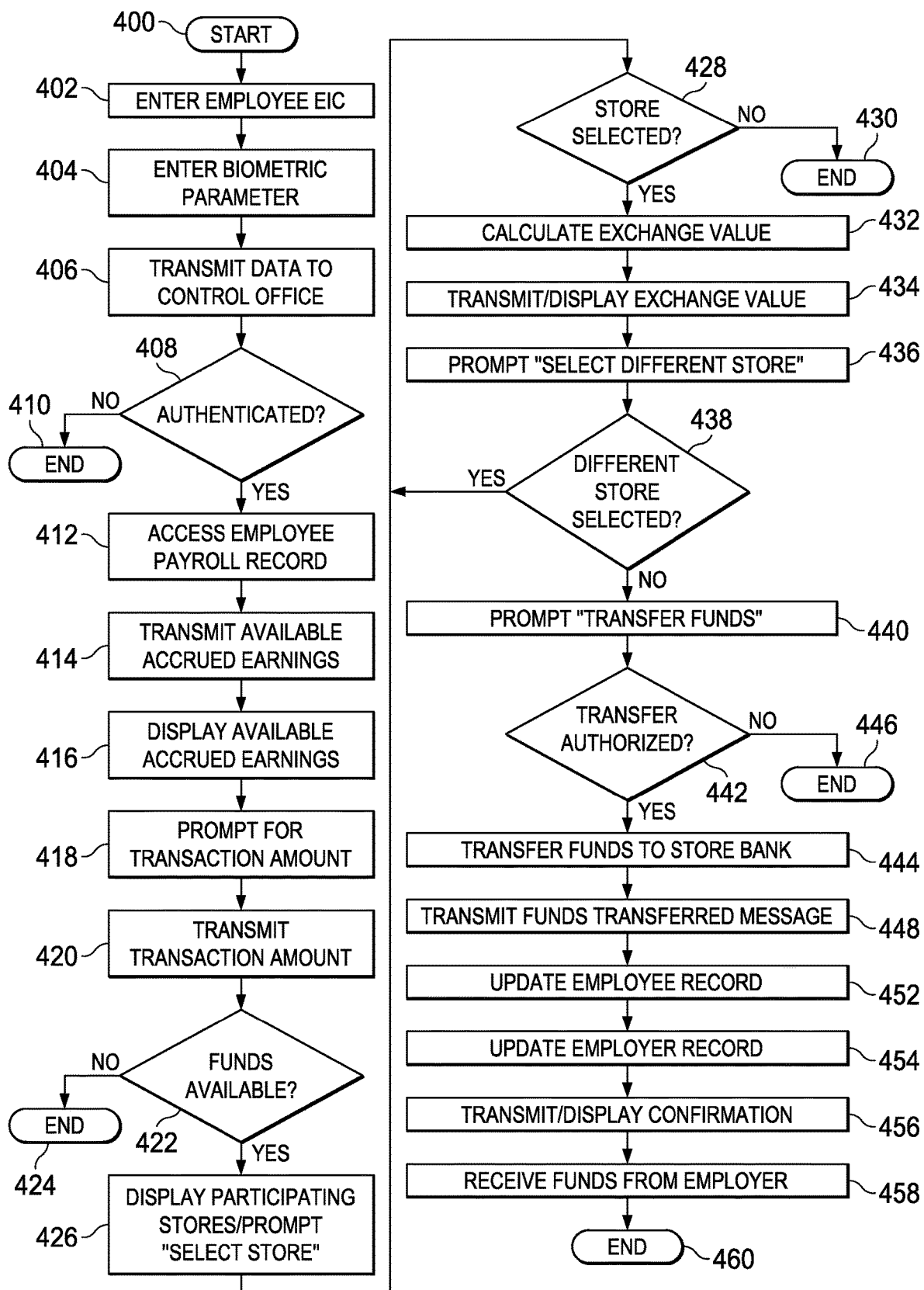
FIG. 4 is a flowchart illustrating one method of employee utilization of accrued and unpaid earnings according to the disclosure.

FIG. 4 is a flowchart illustrating one transaction enabled by system 100. The process begins at 400 when a subscribing employee electronically accesses central office 102 via a user access device such as a kiosk or terminal 150, a personal communications device 152 such as a smart phone or PDA, a personal computer 154 or a similar device 156 having a processor, data storage, user interface and display. The employee enters his or her EIC and/or password at 402 to access his or her account for the transaction. When the employee uses a kiosk or terminal 150 to interface with central office 102, the employee may be required to swipe a card associated with an account, for example a system debit card, rather than entering an EIC. The employee may be also be required to submit a palm vein scan, thumb print, retinal scan or photograph at 404 for verification purposes.

At step 406 the employee information is electronically transmitted from the user device, for example terminal 150, to central office 102 for verification. Processor 118 of central office 102 compares the submitted information, e.g., EIC, password, photograph and/or biometric parameter to information in the employee's record to authenticate the employee's identification at step 408. If the employee's identity is not authenticated, the process terminates at step 410 and the employee may be prompted to re-enter the information. If the subscribing employee's identity is authenticated at 408, central office processor 118 accesses the employee's payroll record, e.g., the employee's accrued but unpaid earnings at 412 and determines the amount of accrued and unpaid earnings available for the employee.

At step 414, central office processor 118 transmits the employee's available accrued but unpaid earnings balance to the user remote network access device 150-156 for display at step 416. At step 418 the employee is prompted to enter a transaction amount which is transmitted to central office 102 at step 420. Processor 118 compares the requested transaction amount to the employee's available accrued and unpaid earnings at step 422 and if the requested transaction amount is greater than the employee's available accrued and unpaid earnings, an "insufficient funds" or "transaction denied" message may be transmitted and displayed to the employee and the process terminated at step 424. The employee may then be prompted to enter a different amount. If the requested transaction amount is available, a participating store or list of participating stores 126 (FIG. 1) is transmitted to the user device and displayed to the employee at 426 and the employee is prompted to select a participating store.

Referring again to FIG. 1, one or more participating stores 126 or similar retail establishments may participate in the service and offer a loyalty program or incentives to subscribing employees. As used herein, a "participating store" 126 is a retail establishment that has elected to interface directly, or indirectly through an associated POS operator 122, with central office 102 and a sponsoring bank 124 to provide the earned and unpaid earnings service to subscribing employees. Participating stores 126 may each be provided with a data storage device 140, one or more data processors 144, one or more point of sale devices 142 and a communications interface 146 enabling the stores to communicate with point of sale operator POS 122, one or more sponsoring banks or financial institutions 124 and/or central office 102.

As used herein, a "sponsoring bank" 124 is a financial institution such as a bank or credit union that maintains an account for a participating store and has elected to interface directly or indirectly with central office 102, a participating store 126, and/or a POS operator 122 to provide the earned and unpaid earnings service to subscribing employees. Each of sponsoring banks 124, associated with participating stores 126, is provided with one or more data storage devices 134, one or more processors 136 and a communication interface 138 enabling the bank to communicate with central office 102, participating stores 126 and/or POS operators 122 via network 114. A participating bank 124 may maintain an account on behalf of a participating store 126 and receive transfers of accrued and unpaid earnings from central office 102 on behalf of employees and maintain records of such transfers and employee balances.

Participating stores 126 may communicate directly with central office 102 and/or banks 124 or indirectly via POS operators 122 or both. Participating stores 126 maintain an account or accounts at sponsoring banks or similar financial institutions 124 where accrued and unpaid earnings transferred by subscribing employees are maintained. Records of funds transferred on behalf of a subscribing employee, employee account balances and other transactions conducted by the employee may be maintained by central office 102, sponsoring banks 124, POS operators 122, and/or by participating stores 126. Participating stores 126 may provide subscribing employees with accretive value in connection with funds transferred by employees to a subscribing store account at bank 124 and spent at the store as an inducement to promote patronage of the store by subscribing employees. As used herein, the term "accretive value" means value added to funds spent by a subscribing employee at participating stores as herein after described.

Figure 5:
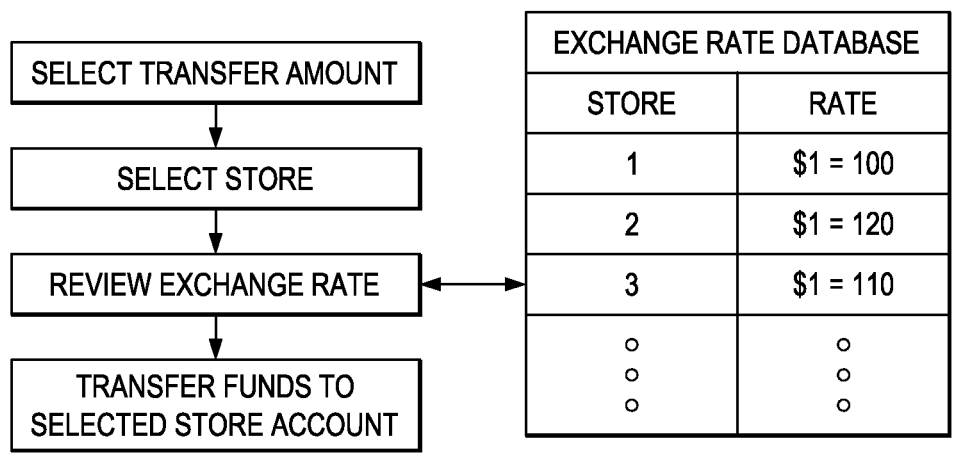
FIG. 5 is a chart representing a selection process according to the disclosure.

Referring again to FIG. 4, after an employee has selected an amount or value to be transferred and the amount has been validated at step 422, at step 426 the employee may be prompted to select a store from a list of stores transmitted by central office processor 118 to user remote network access device 150-156 for display to the employee. Central Office 102 may screen the participating store displayed to the employee based on predetermined criteria, for example, employee preferences, the amount of value to be transferred by the employee. FIG. 5 is chart further illustrating the store selection process. A subscribing employee may choose from multiple participating stores 126 (FIG. 22) when transferring accrued and unpaid earnings to take advantage of the accretive value that may offered by different stores. In one embodiment, after an employee has selected an amount to be transferred and selected a store, central office processor 118 accesses a database of exchange rates and/or incentives offered by different participating stores maintained on central office storage device 116. The exchange rates and/or incentives of participating stores 126 may be transmitted to central office 102 by the participating stores at predetermined intervals, for example daily, at predetermined times, for example at 10:00 am. or when the rates and/or incentives change. Transmission of the exchange rates and/or incentives of participating stores 126 to central office 102 may be a push or pull operation. In other embodiments, exchange rates and/or incentives of participating stores 126 may be transmitted to central office 102 upon receiving a transmission from the central office requesting the exchange rates and/or incentives.

The exchange rate offered by a participating store 126 may be communicated to central office 102 by the store or by a POS operator 122 (FIG. 1) and maintained on database 116 at central office 102. In the illustrated embodiment, store 1 offers no accretive value for purchases made in the store. In other words, one dollar of accrued and unpaid earnings transferred to the sponsoring bank 124 associated with the employee selected participating store will purchase one dollar's worth of goods or services at the store. Store 2 offers a 20% incentive, e.g., a subscribing employee may purchase $1.20 dollars in goods or services at the participating store for each dollar transferred to the store account on behalf of the subscribing employee. In this case, the accretive value is equal to 20% of the funds actually transferred by the employee. Similarly, store 3 offers a 10% accretion incentive, e.g., a subscribing employee may purchase $1.10 dollars in goods or services for each dollar transferred to the store's account at the sponsoring bank on behalf of the subscribing employee. The accretion incentive may be offered as part of a store loyalty program and a subscribing employee may also be provided with additional discounts or points as a member or participant in the store loyalty program.

Figure 6A:
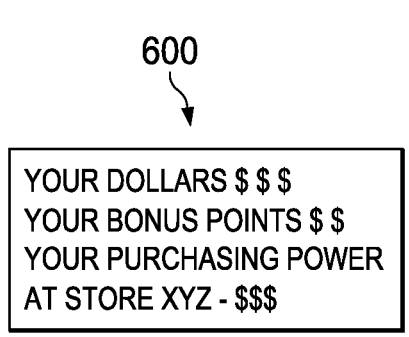
FIG. 6A is a representation of a first display used in connection with the system of FIG. 1.

Referring again to FIG. 4, at step 428 if the employee fails to select a store the process is terminated at 430. Assuming that the employee selects a store at 428, the exchange value, e.g. incentive or accretive value offered by the store, if any, is determined at step 432, transmitted to the user remote network access device 150-156 (FIG. 2) and displayed to the employee at step 434. Any discounts or points resulting from the employee's participation in a store loyalty program may also be displayed. FIG. 6A is an exemplary display that may be transmitted to user device 150-156 and displayed at step 434. The display 600 includes the funds to be transferred (Your Dollars), the purchasing power of the transferred funds at the XYZ store after application of any incentive or accretive value (Your Purchasing Power) and any bonus points (Your Bonus Points) that the employee may have acquired via a store loyalty program. In one embodiment, central office 102 converts funds transferred to store "points" including any accretive value and displays the employee's purchasing power as points at participating store 126. Any reward or loyalty program points may be added to the employee's "points" at the participating store. The employee's "purchasing power" at the participating store 126 including the bonus points may then be displayed to the employee.

Figure 6B:
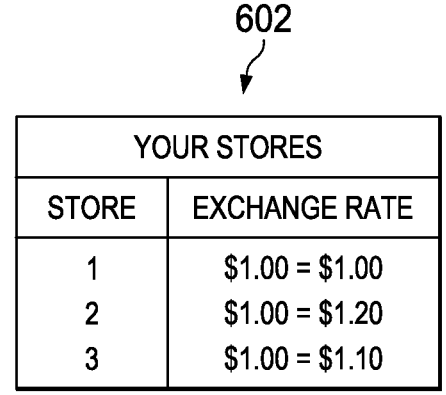
FIG. 6B is a representation of a second display used in connection with the system of FIG. 1.

In order to determine the accretive value or incentive offered by a particular store, central office 102 may query the POS operator 122 serving the store or query the store directly. This may be a push or pull operation with respect to the POS and/or store and may be conducted at predetermined intervals to update any incentive or accretive value offered by the store. In different embodiments, a list of participating stores along with the incentives and/or accretive values offered by the stores may be transmitted for display with user remote network access devices 150-156 and the employee prompted to select from the displayed list. FIG. 6B is an exemplary representation 602 of such a display. As illustrated, store 1 is shown offering no accretive value, store 2 offers 20% and store 3 offers 10% accretive value for purchases made with a subscribing employee's accrued and unpaid earnings. In other words, a subscribing employee may purchase, using his or her accrued and unpaid earnings transferred to the sponsoring bank 124 associated with participating store 2, $1.20 dollars in goods or services for each dollar transferred and spent at participating store 2.

Figure 6C:
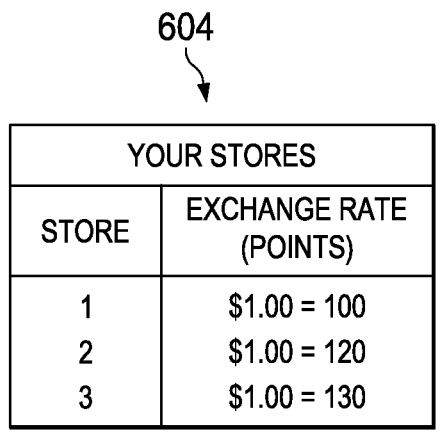
FIG. 6C is a representation of a third display used in connection with the system of FIG. 1.
Figure 6D:
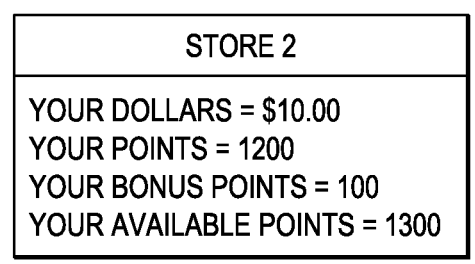
FIG. 6D is a representation of a fourth display used in connection with the system of FIG. 1.

In one embodiment, the value of accrued and unpaid earnings transferred to the sponsoring bank may be converted to "purchasing points." FIG. 6C is an exemplary representation of a display 604 illustrating the accretive value (in points) offered by stores 1, 2 and 3. As illustrated, store 1 offers no accretive value ($1.00=100 points), store 2 offers 20% ($1.00=120 points) and store 3 offers 10% accretive value ($1.00=110 points. FIG. 6D is an exemplary display 606 that may be transmitted to user device 150-156 and displayed at step 434 illustrating the conversion of funds to be transferred (Your Dollars) into points at store 2. As illustrated, an employee may be provided with 1200 points for purchasing goods at store 2 upon transfer of $10.00 to the store. The employee may also be awarded bonus points, for example 100, for participation in a store loyalty program so that the employee has a total of 1300 points available to spend at store 2 after the transfer.

At step 436 the employee may be prompted to select a different store if the employee wishes to determine the incentive or accretive value(s) offered by different participating stores. If the employee selects a different store at 438 the process loops back to 428. If a different store is not selected, the employee is prompted to transfer the funds to the store (e.g. to the sponsoring bank associated with the participating store), at 440. In different embodiments, the exchange value or accretive incentive offered by all or employee selected ones of the participating stores may be transmitted and displayed at step 426 and the employee prompted to select from the displayed participating stores.

If the employee or user authorizes the transfer at 442, the funds are transferred to the participating store bank (sponsoring bank) 124 (FIG. 1) at 444 via central office 102 and held on behalf of the employee in an account maintained by participating store 126 or POS operator 122. In one embodiment, the funds may be transferred to the participating store bank by a bank or other financial institution associated with central office 102 and/or the system operator upon receiving a request for the transfer from central office 102. The funds transfer may be made through the Automated Clearing House (ACH) system. A message is then transmitted from central office 102 at 448 and displayed with user remote network access device 150-156 (FIG. 2) confirming the transfer. A message confirming or identifying the transfer may also be transmitted from central office 102 to the participating store 126 and/or to the POS associated with the participating store. If the employee fails to authorize the transfer at 442, the process ends at 446.

After the funds have been transmitted to the selected store's sponsoring bank or financial institution 124 (FIG. 1), the funds may be made available to the employee via a magnetically encoded or embedded chip card such as a debit card (system debit card). In other embodiments, for example when a subscribing employee wishes to conduct a transaction via a smart phone, personal computer or similar device, the employee may utilize a personal identification code along with a password and/or biometric parameter. The system debit card may be a "branded" card, issued by a financial institution such as a bank or credit card company. However, transactions conducted using the accrued and unpaid earnings system are not credit transactions, e.g., the issuing bank or financial institution does not advance the cost of purchases or fund transfers that are later reimbursed by the employee. Rather, charges made with the system debit card are debited against accrued and unpaid earnings held on behalf of the employee by the sponsoring bank serving employee selected participating store. The employee's system debit card may be used for transactions such as purchases at participating stores as well as ATM withdrawals, cash transfers and with non-stores or other service providers. The subscribing employee may not, however, realize any accretive value or incentive offered by service providers other than participating stores 126.

In one embodiment, the system debit card may be issued to the subscribing employee by the system operator. In other embodiments, the system debit card may be issued by the sponsoring bank, a participating store or the POS operator serving the participating store. The system debit card may also serve to identify the subscribing employee as a member of a loyalty program at a participating store. The employee's system debit card will typically have an employee identification code (EIC) or personal identification code (PIC)

associated therewith. A password and/or biometric parameter may also be associated with the system debit card and used therewith for security purposes.

In other embodiments a subscribing employee may access the available funds with a combination of one or more of an account number, password, biometric parameter, photograph or similar verification means. For example, a subscribing employee may use an account number in combination with a vein scan or thumbprint to access the available funds with a suitably equipped user device 150-156. In another embodiment, a subscribing employee may use a combination of a Personal Identification Code (PIC) or Employee Identification Code (EIC) and a password to access the funds with personal computer 154. Different combinations and variations of identification and verification parameters are possible.

Referring still to FIG. 4, at step 452 the employee record at central office 102 is updated to reflect the transfer. Central office processor 118 may also transmit a record of the transaction to the subscribing employee's employer system 104 to enable the employer system 104 to update the employee's record on the employer's ERP or other payroll record system at step 454. At step 456 a confirmation message is transmitted and displayed to the employee, confirming the transfer. Prior to the end of the pay period or at another predetermined date/time, the employer disburses funds to the system operator at 458 for the accrued and unpaid earnings accessed by employees subscribing to the earned and unpaid earnings system and the process ends at 458.

Figure 7:
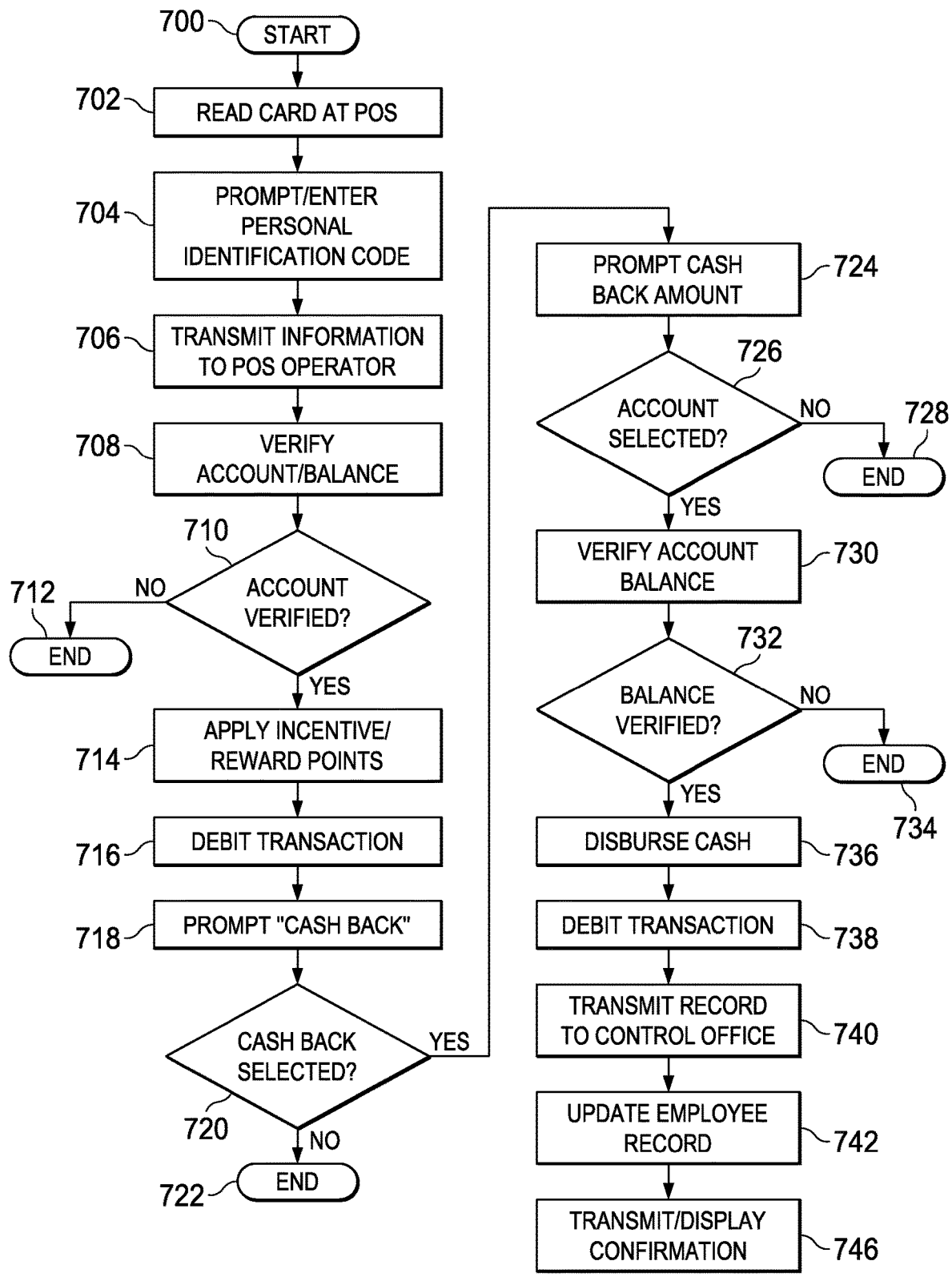
FIG. 7 is a flowchart illustrating a method of use of the system of FIG. 1.

FIG. 7 is a flowchart illustrating one transaction using the earned and unpaid earnings system by a subscribing employee. The transaction may be described as a "closed loop" transaction insofar as the transaction involves a participating store 126, a sponsoring bank 124 serving the participating store, a POS operator 122 serving the participating store and central office 102. After a subscribing employee has accomplished a transfer as described in connection with FIG. 24, the process begins at step 700 when the employee patronizes the participating store. After the employee has selected his or her purchases, the subscribing employee's system debit card is read at step 702 with POS device 142 (FIG. 1). At step 704 the subscribing employee or user is prompted and enters his or her personal identification code and/or password associated with the debit card and the information is transmitted to POS operator 122 at 706. The employee information may be transmitted to central office 102 for verification. The employee's account and balance are verified at 708. Confirming the subscribing employee's account and balance may require a query from participating store 126 or POS operator 122 to sponsoring bank 124, and/or central office 102 for verification. If the account is invalid or if the balance is less than the purchase or transaction amount, the process ends at 712 and the subscribing employee may be prompted to re-enter the account information, for example the password, or informed that the balance is less than the purchase amount.

If the subscribing employee's account and balance are verified at 708, any accretive value or incentive offered by the participating store is credited to the purchase by the POS operator 122 or store 126 (FIG. 22) at step 714. Any loyalty program reward points, discounts or incentives may also be applied at this step. At step 716, the subscribing employee's account is debited for the transaction amount. This may be accomplished with a transmission from POS operator 122 to sponsoring bank 124 and/or central office 102. It will be appreciated that during the course of the transaction, there may be multiple interactions between participating store 126, POS device 142, sponsoring bank 124 and central office 102 and other financial service providers to complete the transaction.

At step 718, the subscribing employee may be prompted to select a cash back transaction. If the subscribing employee declines the process ends at step 722. Alternatively the subscribing employee is prompted to enter an amount at step 724. If the employee fails to enter an amount for the cash back transaction at step 726, the process ends at 728. After the subscribing employee selects an amount for a cash back withdrawal, the employee's account balance may be verified at 730. If the requested amount is greater than the employee account balance, the process ends at 734 and the employee may be prompted to enter a different amount. If the account balance is determined to be at least equal to the requested amount of cash back at 732, the cash is disbursed at 736. In this case, no accretive value is involved and the subscribing employee's account is debited for the disbursed cash at 738 at sponsoring bank 124. A record of the completed transaction is transmitted to sponsoring bank 124 by store 126 or by POS 122 to central office 102 at 740 and the subscribing employee's records are updated on database 116 at step 742. At step 744, a confirmation message is transmitted and displayed to the employee and the process ends at 746

In one embodiment of the operation of the interface with the participating stores 126 by the user, the steps will be described in sequence. The first step, as described hereinabove, is to have the user access their available funds, which are determined based upon the accrued but unearned funds from their employer. These are funds that are available to the user for expenditures at participating stores 126 as well as for other things also. However, with respect to the participating stores 126, the sequence is that the user is first provided information as to the availability of the funds and then must indicate to the central office 102 a desire to transfer all or a portion of those funds. The amount of transfer is provided to the central office 102 such that the central office can confirm that the transfer is at or below the available funds for that user. If, for example, the user in error requested a transfer of more than was available for some reason, i.e., the user erroneously thought they could transfer the entire amount of the paycheck that they expected to receive as opposed to only those funds that were accrued before the full pay period, then the central office 102 would provide an indication of such to the user. However, if the funds requested were available, at that time, the central office 102 may take the following steps:

1) query the database of participating stores 126 for related information that can be provided to the user;
2) determine for each participating store 126 what is to be provided to the user and the form in which that is to be provided to the user;
3) assemble a set of participating stores 126 that corresponds to the transfer request, i.e., the number of participating stores that will allow transfer of funds from that user in the amount that user wants to transfer;
4) transmit set of assembled participating stores 126 to the user for display to the user on network access device 150-156;
5) determine if a selection is made by the user and, upon selection, process the selection.

Thus, participating stores 126 have the ability to populate a database by either a push operation or a whole operation in order to provide for incentives. These participating stores could push the data to the database in real time such that various values can be altered as presented to the user. This is stored in the database 116. Since the central office 102 must confirm that there is a transferable value available prior to selecting the participating stores, this information can be used to determine what the information is that will be displayed to the user. If all participating stores 126 are to be displayed, that will be done but, the central office 102 can also filter this information by the value to be transferred. Thus, a value to be transferred can then be converted or transformed into a different value of purchasing power or participating points. This will all be assembled based upon predetermined criteria, including participating relationships with the various participating stores, the value to be transferred, etc. Thus, what this provides is a window from the participating store 126 to the user in order to allow participating store to attract funds from the user. The participating store is not necessarily aware of a particular user that is designated to transfer funds, although a profile of the user can be a filtering factor. From a contractual standpoint, the central office 102 can control the frequency with which the criteria for transforming user funds into purchasing power or purchasing funds at the store in a "pull" operation or the store can have direct access to the database 116 to update their criteria. It may be that store 126 has a certain sale that is going on at a particular time and desires to attract funds. The difference between this operation and offering a discount for purchase is that there is no purchase prior to the transfer of funds. Once the user decides to transfer funds for "purchasing power," funds are transferred to the participating store's sponsoring bank 124 or other banking establishment. These funds are then actually in the sponsoring bank 124 of the participating store.

Accrued but unpaid earnings may be accessed and used by subscribing employees at establishments other than participating stores. For example, a subscribing employee may use his or her system debit card at an ATM to withdraw cash or pay bills or at non-participating retail establishment to purchase goods or services. In these transactions, the employee's accrued and unpaid earnings that have been conveyed to the sponsoring bank as described in connection with FIG. 4 are debited for the transactions through one or more financial networks. A subscribing employee is thus able to access and utilize his or her unpaid earnings in both a participating store that may offer accretive value or incentives and with non-participating entities.

Figure 8:
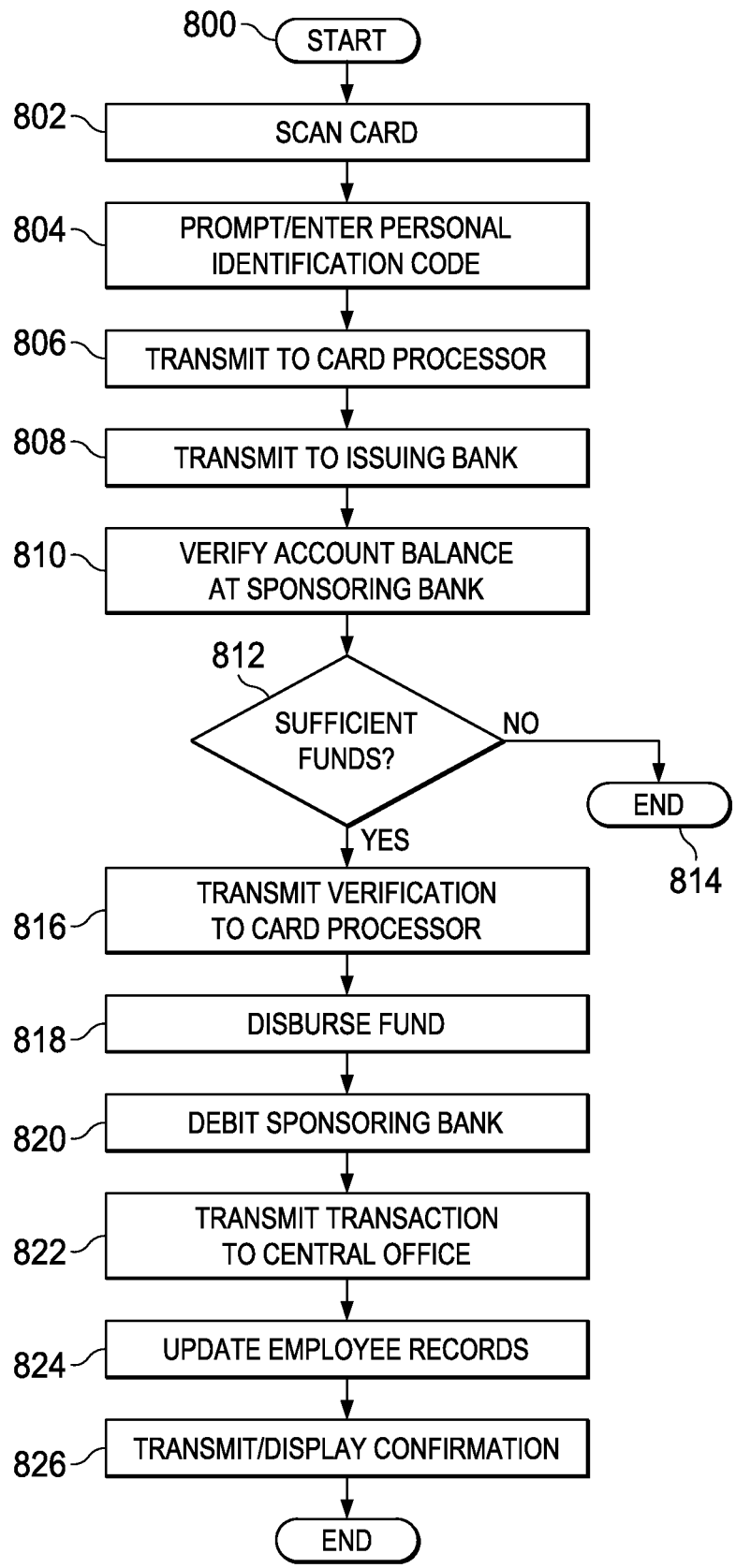
FIG. 8 is a flowchart illustrating an alternate method of use of the system of FIG. 1.

FIG. 8 is a flowchart illustrating one use of an employee's accrued and unpaid earnings at a non-participating store or establishment. The transaction described in connection with FIG. 8 may be described as an "open loop" transaction insofar as the transaction includes at least one non-participating store or establishment, e.g., a store or establishment that is not elected to interface directly, or indirectly through an associated POS operator 122, with central office 102 to provide the earned and unpaid earnings service to subscribing employees.

The process begins at step 800 after the subscribing employee's accrued and unpaid earnings have been conveyed to a sponsoring bank as described in connection with FIG. 4. At step 802 the employee passes his or her system debit card though a card reader at the non-participating entity to purchase the selected goods or services. The subscribing employee is prompted to and enters his or her personal identification code or password at 804. The subscribing employee may also submit a biometric parameter or photograph for verification. At step 806, the subscribing employee's information is transmitted to card processor 107 for verification. Card processor 107 transmits the transaction information to the issuing bank, (e.g. the financial institution that issued the system debit card), at 808. At step 810, issuing bank 109 transmits the transaction information to the sponsoring bank to compare the transaction amount with the employee's accrued and unpaid earnings balance. In different embodiments, issuing bank 109 may use a shared database to compare the transaction amount with the employee's balance. In other embodiments, card processor 107 and issuing bank 109 may be the same entity.

If the employee's accrued and unpaid earnings balance at the sponsoring bank is less than the transaction amount at step 812, the process is terminated at 814 and an "insufficient funds" message may be transmitted. If sufficient funds are available, the issuing bank transmits a confirmation to card issuer 109 at step 816 and the funds are disbursed at step 818. At step 820, issuing bank 820 debits sponsoring bank 124 for the transaction. A record of the transaction is transmitted to central office processor 118 which updates the employee's record in database 116 to reflect the transaction at 824. At 826, a confirmation message is transmitted and displayed to the employee and the process ends at 828.

Figure 9:
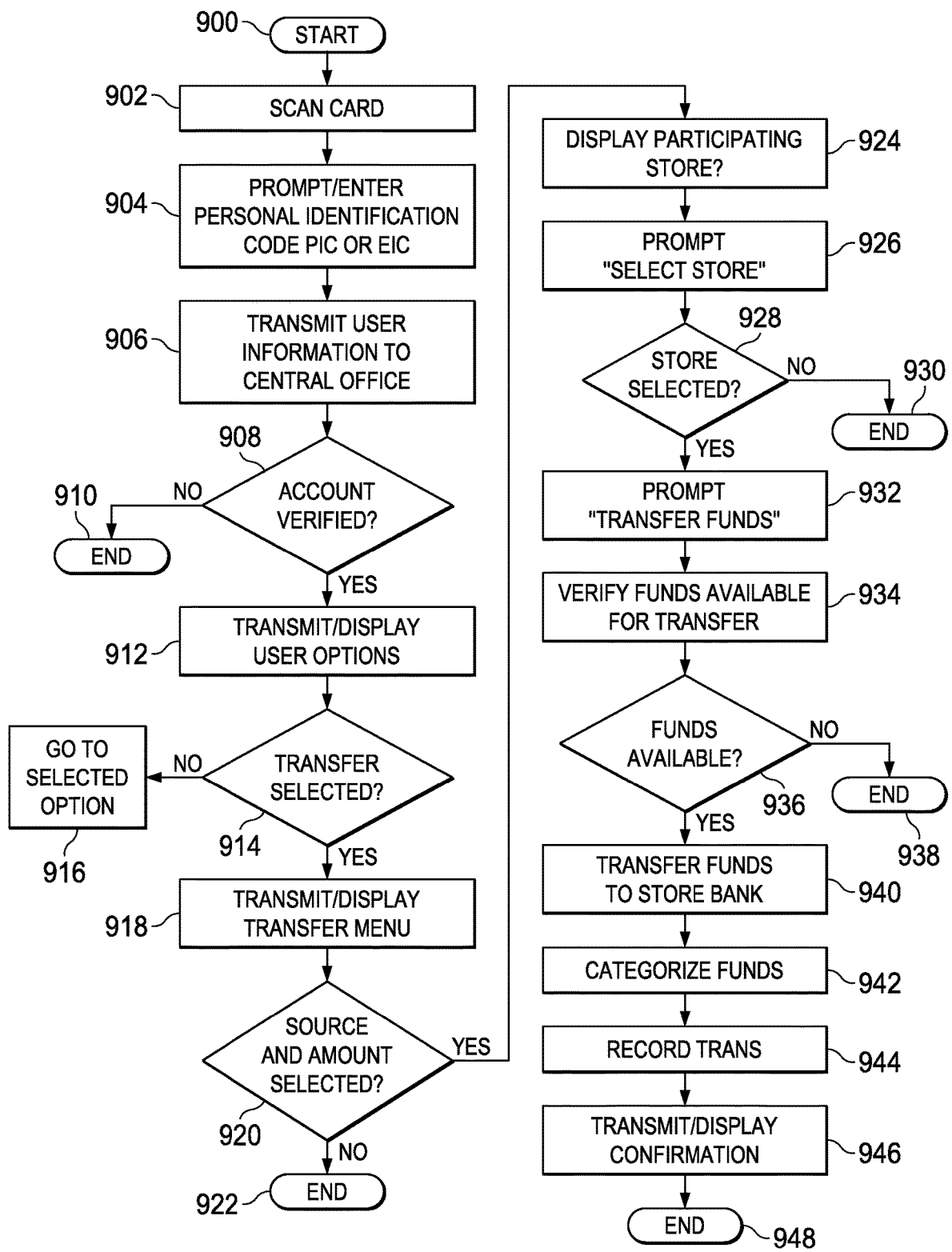
FIG. 9 is a flowchart illustrating one method of value transfer on behalf of a user according the disclosure.

In another variation, funds from sources other than accrued and unpaid earnings may be transferred to an employee's system debit card for use in closed and open loop transactions. FIG. 9 is a flowchart illustrating the transfer of funds from a source other than accrued and unpaid earnings. The process begins at 900 when a user electronically accesses central office 102 (FIG. 1) via a user access device such as a kiosk or terminal 150, a personal communications device 152 such as a smart phone or PDA, a personal computer 154 or a similar device 156 having a processor, data storage, user interface and display. At step 902 the user swipes his or her system debit card if conducting a transaction from a terminal 150 (FIG. 2) and/or enters his or her EIC, PIC or other identifier and/or password at 904 to access his or her account for the transaction. The user information is transmitted to central office 102 at 906 and the account verified at 908. If the account cannot be verified, the process ends at 910 and an error message may be displayed to the user.

Figures 10, 11, 12:
FIG. 10 is a representation of a first display used in connection with the method of FIG. 9.
FIG. 11 is a representation of a second display used in connection with the method of FIG. 9.
FIG. 12 is a representation of a user record including maintained in the system of claim 1.

If the account is verified at 908, a menu may be transmitted and displayed to the user at step 912. FIG. 10 is an exemplary menu which provides the user with the option of checking his or her balance, transferring funds or making a withdrawal. If the user selects a funds transfer at step 914, a funds transfer menu may be transmitted from central office 102 to the user device 150-156 (FIG. 1) for display to the user at 918. Alternatively, if another service is selected, for example, a balance inquiry, the process shifts to the selected option at 916.

FIG. 11 is an exemplary display that may be presented if the user has selected a funds transfer at step 918. As illustrated, the user may choose to deposit cash or a check or make a charge against a debit, credit or gift card. In other variations, the user may arrange a direct deposit of earnings or salary to be transferred to the sponsoring bank for the selected participating store. At step 920 the user may select the source and amount of funds to be transferred using, for example, the menu of FIG. 11 with a touch screen or keypad input. If the user fails to select a source or amount of funds to be transferred, the process ends at 922.

After the user has selected a source and amount of funds to be transferred, a display of participating stores 126 (FIG. 1) may be transmitted to the user at 924. FIGS. 6B and 6C are exemplary displays of participating stores that indicate the accretive value or incentive that may be offered by different stores. As illustrated, store 1 offers no accretive value, store 2 offers 20% and store 3 offers 10% accretive value for purchases made using the system debit card. In other words, a subscribing employee may purchase, using his or her system debit card and funds transferred to the sponsoring bank 124 associated with participating store 2, $1.20 dollars in goods or services for each dollar transferred and spent at participating store 2. At step 926 the user is prompted to select a store to receive the funds transfer.

If the user selects a participating store 126 at step 928, the store selection is transmitted to central office 102 and a prompt to transfer funds is transmitted to the user and displayed at 932. If a store is not selected the process ends at 930. If the user elects to transfer funds, at step 934 the availability of funds for transfer is verified. For example, if the user has selected a cash transfer, the amount of cash received from the user by terminal 150 is confirmed. If the user has selected a debit or gift card transfer, the user's available balance in the card account may be confirmed. If the user chooses a transfer by means of a check, the check may be scanned and the user's bank may be queried to determine if the funds are available for transfer. Similarly, if the user elects to transfer funds by means of a credit card charge, the card issuer may be queried to validate the account.

If the funds are available and/or the source of the funds is verified for transfer at step 936, the funds are transferred to the selected sponsoring bank 124 (FIG. 1) at which the user selected store 126 maintains an account for receipt of the funds. If the funds are not available, or insufficient, the process ends at 938 and a message informing the user that the transfer has not been approved is transmitted to the user by central office 102 and displayed to the user.

At step 942 the funds may be categorized and identified by source, by central office 102 and/or sponsoring bank 124. For example, accrued but unpaid earnings transferred by an employee may be categorized and identified separately from funds transferred as a result of a credit card charge. Categorizing user funds may be desirable in order to limit or restrict the use of such funds. For example, it may not be desirable to award accretive value or allow a cash back transaction with funds charged against a credit card. Thus, it may be possible for a user to have funds from different sources available for use with the system debit card. For example, a user may have $100.00 from a charge to a gift card and $100 from a transfer of accrued and unpaid earnings available. In this embodiment, central office 102 and/or sponsoring bank 124 will maintain a record of the source of the funds for each user.

FIG. 12 is a representation of a user record 1200 maintained on data storage device 116 of central office 102 wherein available funds are categorized by source. As illustrated, the user record may include fields for information such as an employee's name, employee identification code (EIC) and/or password, a social security number (SSN), a driver's license number, the employee's address, the employee's accrued hours work, the employee's current average net page, preferred participating stores (as hereinafter described) patronized by the user and/or stores where the user is a subscriber to a loyalty program, the user's available funds or account balance categorized by source, past transactions, financial institutions and services used by the user with the corresponding account numbers and codes along with other pertinent information. The user record may also include a photograph of the user and a biometric parameter such as a palm vein scan, a fingerprint, a retinal scan or a voice print to aid in identifying and authenticating the user in connection with a transaction.

After the funds have been transferred to the sponsoring bank 124 (FIG. 1) at 940, the user's record at central office 102 and or sponsoring bank 124 may be updated to reflect the transfer at step 944. A confirmation message may be transmitted and displayed to the user at step 946 and the process ends at 948. The user may then access and use the funds as described in connection with FIGS. 7 and 8.

Figure 13:
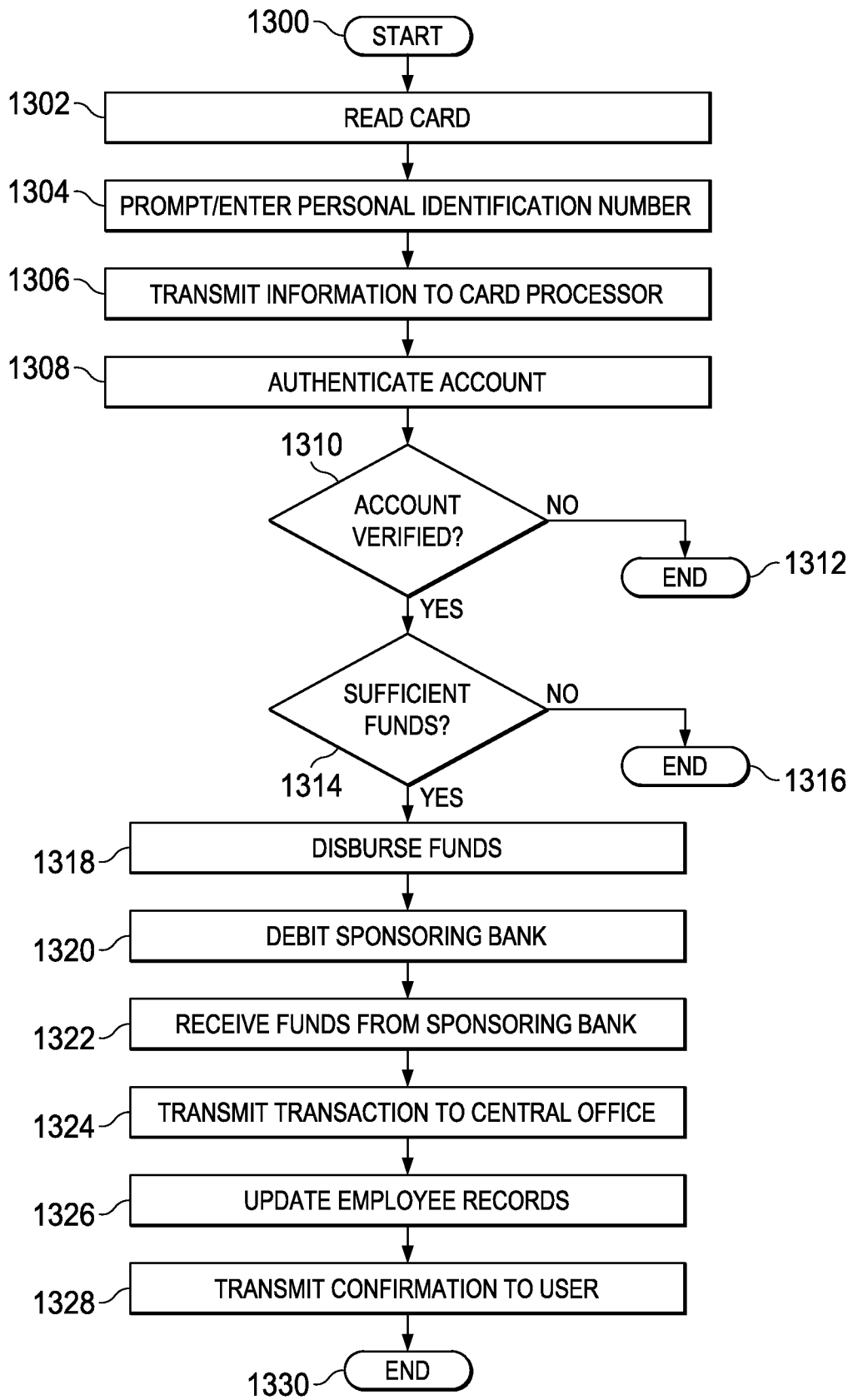
FIG. 13 is a flowchart illustrating a method of conveying value on behalf of a user according the disclosure.

FIG. 13 is a flowchart illustrating one use of an employee's use of a balance on his or her system debit card in an "open loop" transaction, e.g., a transaction including a non-participating store or establishment, e.g., a store or establishment that not elected to interface directly, or indirectly through an associated POS operator 122, with central office 102 to provide the service to subscribing employees. The process begins at step 1300 after the subscribing employee has transferred value via accrued and unpaid earnings, a check, cash transfer, gift card or other means and the value has been conveyed to a sponsoring bank as described in connection with FIG. 4. At step 1302 the employee passes his or her system debit card though a card reader at the non-participating entity to purchase selected goods or services. The subscribing employee is prompted to and enters his or her personal identification code or password at 1304. The subscribing employee may also submit a biometric parameter or photograph for verification.

At step 1306, the subscribing employee's information is transmitted to card processor 107 (FIG. 1) for verification. Card processor 107 compares the submitted information, e.g., account number, password, photograph and/or biometric parameter to information in the employee's record to authenticate the employee's identification at step 1308. In one embodiment, card processor 107 communicates with central office 102 to authenticate employee's identity. For example, if a biometric parameter such as a fingerprint or palm vein scan is required for identification, card processor 107 may transmit the parameter to central office 102 for comparison and verification by central office processor 118. If the employee's identity is not authenticated at step 1310, the process terminates at step 1312 and the employee may be prompted to re-scan the system debit card and/or re-enter the authentication information.

At step 1310, card processor 107 verifies that there are sufficient funds available for the purchase or charge. Card processor 107 processor may communicate with the issuing bank 109 and/or the sponsoring bank 124 (FIG. 1) to verify the employee's available balance at the sponsoring bank. After comparing the employee's balance with the transaction amount at 1314, if the employee's available balance at sponsoring bank 124 is less than the transaction amount, the process is terminated at 1316 and an "insufficient funds" message may be transmitted. If sufficient funds are available, card processor 107 disburses funds to the non-participating store or establishment at 1318. Card processor 107 or issuing bank 109 then debits the employee's balance for the transaction amount at sponsoring bank 124 at step 1320 and receives the funds at 1322. At step 1324, card processor 107 communicates the transaction information to central office 102. Central office processor 118 then updates the employee's record to reflect the transaction at 1326. A confirmation message is transmitted to the employee at 1328 and the process ends at 1330.

Figure 14:
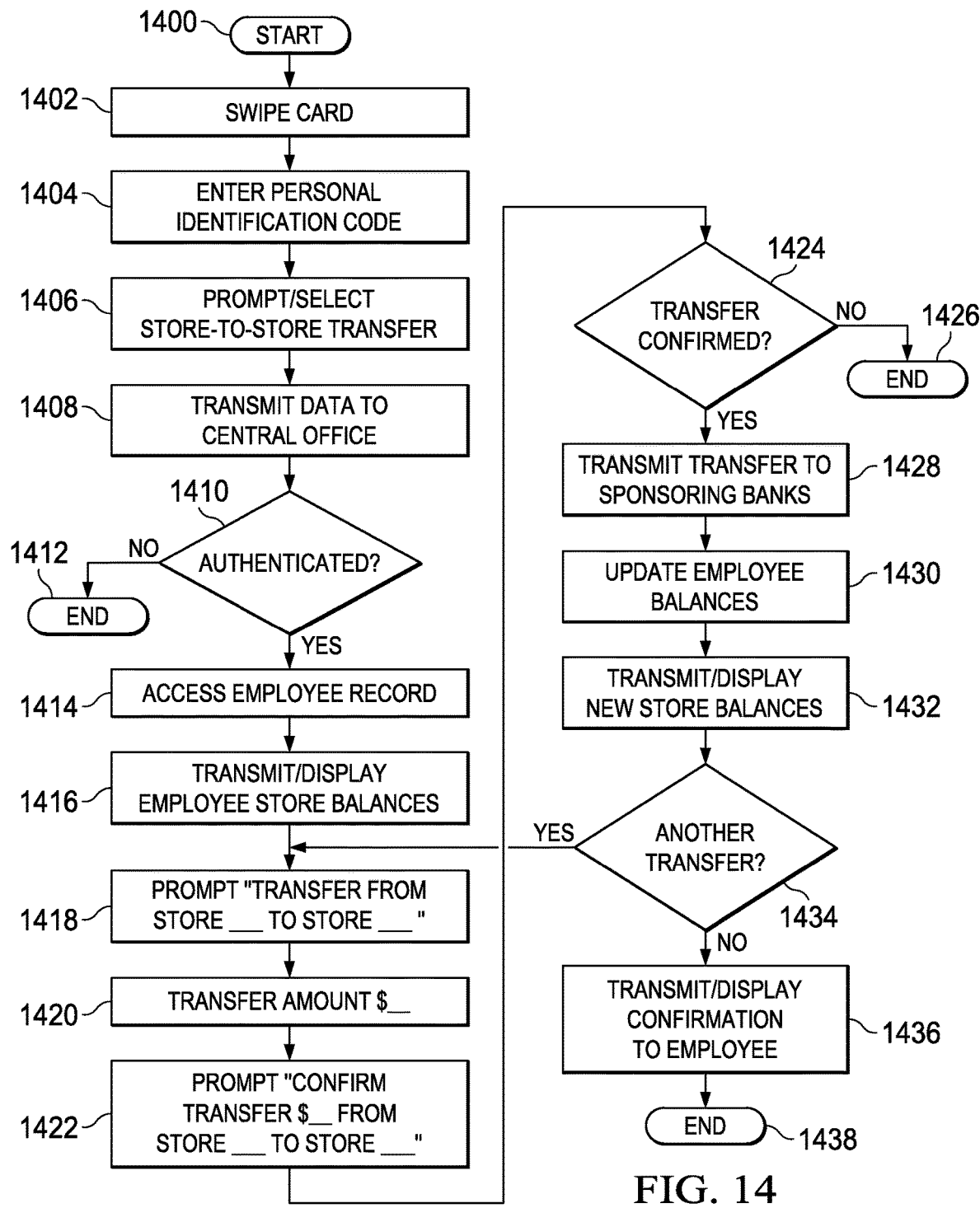
FIG. 14 is a flowchart illustrating a method of transferring balances between stores according to the disclosure.

In some instances, an employee that has a balance at a participating store may wish to transfer some or all of his balance to a different participating store. FIG. 14 is a flowchart illustrating a method of transferring part or all of a balance from one or more participating store to a different one or more participating stores. The process begins at 1400 when an employee with a balance at a participating store accesses system 100 by, for example, swiping his or her system debit card at a user access device such as a kiosk or terminal 150 at step 1402. In different embodiments an employee or user may employ a personal communications device 152 such as a smart phone or PDA, a personal computer 154 or a similar device 156 having a processor, data storage, user interface and display to access the system. At step 1404 the user enters his or her personal identification code or employee number and/or password. The employee is prompted to select a service at 1406. If the employee selects a store-to-store transfer, at 1408 his or her information is transmitted to central 102 for verification/authorization. If the employee's identity and account information cannot be authenticated at 1410, the process is terminated at 1412 and an error message may be transmitted and displayed to the user.

If the employee's identity and account is authenticated at 1410, central office processor accesses the employee's record in database 116 at 1414 and retrieves the employee's balances at participating stores 126. The information is transmitted and displayed to the employee at step 1416. FIG. 15 is an exemplary display showing that the employee, at store 1 has a point value of 1200, a cash balance of $70.00 and an accretive or bonus point value of 1400 and at store 2, a point value of 800, a cash balance of $20.00 and an accretive or bonus point value of 900.

At step 1418 the employee is prompted to make a transfer between participating stores 126 and at 1420 prompted to enter an amount to be transferred. Normally, the transfer will be a dollar amount; however, in some instances the transfer may be in terms of purchasing points. After the employee has selected a transfer between participating stores 126 and an amount to be transferred, he or she is prompted to confirm the transfer at 1422. If the transfer is confirmed at step 1424 the transfer is transmitted to the sponsoring banks 124 associated with the stores 126 by central office 120 at step 1428. The sponsoring banks 124 associated with the participating stores 126 transfer funds reflecting the store-to-store transfer and update the employee records at the banks At step 1430, the employee's record at central office 102 is updated to reflect the new balances at the participating stores 126, including the cash balance, point balance and accretive value or bonus point values. The new participating store balances, (cash, points and accretive/bonus points) are transmitted and displayed to at step 1432 and the employee is prompted to make an additional transfer at step 1434. If the employee elects to make an additional transfer, the process loops back to step 1418. If the employee declines to make an additional transfer, a confirmation of the transfer is transmitted to the employee at 1436 along with a display of his or her balances after the transfer(s). FIG. 16 is an exemplary display of the employee balances of FIG. 15 after a transfer. The employee has transferred $64 dollars from store 1 and $50 dollars from store 2 to store 3. After the transfer, the employee has a point value of 200, a cash balance of $6.00 and an accretive or bonus point value of 110 at store 1, a 0 balance at store 2 and a point value of 2100, cash balance of $114 and a total point value, including accretive and/or bonus points, of 2400 at store 3.

It will be appreciated by those skilled in the art having the benefit of this disclosure that the transaction system described herein provides a system and method for enabling employees to access and utilize accrued and unpaid earnings. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method utilizing a remote networked terminal, the method comprising:

receiving, by a central office processor, from the remote networked terminal including biometric interface devices including at least two of a fingerprint scanner, a palm vein scanner, and a retinal scanner each coupled to a processor via physical system resource interfaces, an electronic request to access a record of accrued and unpaid earnings for a predetermined time period;

receiving, with the central office processor from the remote networked terminal via the biometric interface devices, biometric parameters of an employee comprising at least two of a fingerprint, a palm vein scan, and a retinal scan;

receiving, with the central office processor from the remote networked terminal, a photograph of the employee;

comparing the biometric parameters and the photograph with information in a central office database to authenticate an identity of the employee, wherein the information in the central office database includes a user record for the employee that includes stored biometric parameters and a stored photograph of the employee;

generating, in response to authentication of the identity of the employee, a user interface for display on the remote networked terminal including a plurality of options including a selectable option for using the accrued and unpaid earnings;

receiving a selection on the generated user interface;

accessing, with the central office processor in response to authentication of the identity of the employee, the central office database including the record of the accrued and unpaid earnings for the predetermined time period and determining an amount of the accrued and unpaid earnings for the predetermined time period available to the employee;

determining, by the central office processor, whether to suspend access to the record of accrued and unpaid earnings for the predetermined time period according to a predetermined date and/or time;

setting, by the central office processor, a suspended status that suspends access to the record of accrued and unpaid earning for the predetermined time period;

determining, by the central office processor after the authentication of the identity of the employee, whether to allow or deny the electronic request to access the record of accrued and unpaid earnings for the predetermined time period based on the determination whether to suspend access according to the predetermined date and/or time;

determining whether to allow or deny the electronic request to access the record of accrued and unpaid earnings for the predetermined time period based on an access amount limit on the accrued and unpaid earnings;

releasing, by the central office processor, the suspended status based on a temporal condition;

transmitting, upon the central office processor determining to allow the electronic request to access the record of accrued and unpaid earnings for the predetermined time period, the accrued and unpaid earnings to the remote networked terminal for display to the employee with the remote networked terminal;

accessing, by the central office processor, a database including exchange rates associated with a plurality of participating stores, wherein the exchange rates are pushed to the central office database from the plurality of participating stores to provide for values to be altered in real time;

determining an accretive value for each of the plurality of participating stores based on one or more of the exchange rates wherein the accretive value is defined by a percentage of value of purchases made with the accrued and unpaid earnings;

transmitting, from the central office processor, to the remote networked terminal, a plurality of participating stores and the accretive value offered to employee by each of the participating stores for purchasing goods and services at the participating stores with the accrued and unpaid earnings and displaying the plurality of participating stores and the accretive value offered to the employee by each of the participating stores with the remote networked terminal and wherein the accretive value is determined by each of the participating stores;

screening the plurality of participating stores for display on the remote networked terminal based on predetermined criteria;

displaying, on a display of the remote networked terminal, the plurality of participating stores corresponding to the screened plurality of participating stores;

displaying, if one of the plurality of participating stores is selected, the accretive value offered for the selected one of the plurality of participating stores;

looping back to the displaying on the display of the plurality of participating stores in response to an input based on a prompt on the display to select a different participating store; and proceeding with an electronic transfer, or otherwise terminating the method upon a failure to receive a selection of a participating store of the plurality of participating stores.

2. The method of claim 1 wherein the accrued and unpaid earnings include earnings due the employee prior to an end of a payroll period but before the earnings have been disbursed to the employee.

3. The method of claim 1 wherein the accrued and unpaid earnings include earnings due the employee on a predetermined date prior to an end of a payroll period but before the earnings have been disbursed to the employee.

4. The method of claim 1, further comprising:

generating, at the remote networked terminal, an electronic request to transfer a portion of the accrued and unpaid earnings to selected one or ones of the participating stores;

receiving, with the central office processor, the electronic request to transfer the portion of the accrued and unpaid earnings to the selected one or ones of the participating stores;

transmitting, from one or more of the participating stores, a query to a bank, wherein the query requests verification of an account of the employee;

transferring, from the bank, the portion of accrued and unpaid earnings to a sponsoring bank where the selected one or ones of the participating stores maintains the account wherein the transferred portion of the accrued and unpaid earnings are held whereupon the employee may utilize the transferred portion of the accrued and unpaid earnings to make purchases at the selected one or ones of the participating stores;

updating, with the central office processor, the record of accrued and unpaid earnings for the predetermined time period in the database to reflect the transferred portion of the accrued and unpaid earnings;

identifying a category of the transferred portion of accrued and unpaid earnings based on a source of the accrued and unpaid earnings, wherein the identifying of the transferred portion of accrued and unpaid earnings separately categorizes the source of the transferred portion of accrued and unpaid earnings from other funds in the account of the employee; and limiting use of funds in the account of the employee based on the category of the transferred portion of accrued and unpaid earnings and based on a category of other funds in the account of the employee.

\* \* \* \* \*